United States Patent [19]

Swanson et al.

[11] 3,947,354

[45] Mar. 30, 1976

[54] REMOVAL OF HEAVY METAL IONS FROM WASTEWATER

[75] Inventors: Charles L. Swanson, Dunlap; Robert E. Wing, Peoria; William M. Doane, Morton, all of Ill.

[73] Assignee: The United States of America as represented by the Secretary of Agriculture, Washington, D.C.

[22] Filed: Apr. 18, 1975

[21] Appl. No.: 569,431

Related U.S. Application Data

[63] Continuation-in-part of Ser. No. 342,134, March 16, 1973, abandoned.

[52] U.S. Cl................................ 210/53; 210/54
[51] Int. Cl.²...................................... C02B 1/20
[58] Field of Search............ 210/49, 52, 53, 54, 51, 210/58; 260/233.3 R; 162/175

[56] References Cited
UNITED STATES PATENTS

| | | | |
|---|---|---|---|
| 2,629,494 | 2/1953 | Brown | 260/233.3 R |
| 3,147,218 | 9/1964 | Booth et al. | 210/54 |
| 3,259,570 | 7/1966 | Priesing et al. | 210/53 |

FOREIGN PATENTS OR APPLICATIONS

| | | | |
|---|---|---|---|
| 46-39544 | 11/1971 | Japan | 210/49 |

OTHER PUBLICATIONS

Russell et al., Cereal Pulps, Prep. and Appl. of Cross-Linked Cereal Xanthates in Paper Products, TAPPI:45, 1962, pp. 557–566.

"Recovery of Metals from their Solutions" Chem. Abstract, 1961, 9242 a, b.

*Primary Examiner*—Charles N. Hart
*Assistant Examiner*—Benoit Castel
*Attorney, Agent, or Firm*—M. Howard Silverstein; Max D. Hensley; David G. McConnell

[57] ABSTRACT

Concentrations of undesirable heavy metals in industrial wastewater are reduced to below or very close to the most stringent aqueous discharge limits. This is accomplished by forming an insoluble metal-polyelectrolyte complex which can be easily and economically removed from the effluent.

4 Claims, No Drawings

REMOVAL OF HEAVY METAL IONS FROM WASTEWATER

BACKGROUND OF THE INVENTION

This is a continuation-in-part of Ser. No. 342,134 filed Mar. 16, 1973 now abandoned.

This invention relates to the removal of heavy metal ions from aqueous solutions by coprecipitation in polyelectrolyte complexes of two oppositely charged polymers.

Increased awareness of the extent and hazards of pollution in natural waters has prompted development of many methods for removing heavy metals from wastewaters which include:

1. adsorption or reaction with insoluble material such as ion-exchange resins, carbon, or wool;
2. reduction with more active metals or soluble reagents such as sodium borohydride or hydrazine;
3. flocculation with other cations such as aluminum or calcium ions;
4. bacterial removal; and
5. precipitation as the insoluble complex or salt of soluble reagents such as sulfides, xanthates, or aerofloats.

Jellinek et al. [Water Res. 6: 305 (1972)] reported that polyelectrolyte complexes remove and recover metal ions from polluted water, but, even though their polycarboxylic acid polymers complexed considerable amounts of several metals, residual levels remained well above acceptable limits.

We have discovered a method of removing heavy metal ions from aqueous solutions to levels which are below or very close to the most stringent limits. The method comprises determining the amount of heavy metal ions in an aqueous solution, adding to the aqueous solutions a water-soluble cationic polymer and a water-soluble anionic polymer such as starch xanthate in amounts sufficient to form a cationic polymer-heavy metal ion-anionic polymer complex precipitate, and separating the precipitate from the supernatant. The water-soluble cationic polymer is present in the aqueous solution in amounts of from 1 to 2,000 times the weight of heavy metal ions.

This method of heavy metal ion removal appears to have several advantages over existing methods: (a) Recovery is simple because treating the polyelectrolyte complex with mild acid releases a metal. (b) The volume of sludge is small compared to that from lime treatment. (c) The physical nature of the sludge is not gelatinous as usual with basic precipitation, and the floc settles faster and can be removed easier (filtration, centrifugation, or decantation). (d) In some effluents, suspended solids have to be removed before treatment. With the xanthate method, much of the suspended solids is removed during treatment. (e) Careful control of pH is required when the heavy metals are precipitated with a base, as some metallic hydroxides will redissolve if the pH is raised too high. The starch xanthate method has proved effective over a pH range of 3 to 11. (f) Several chemical treatments require considerable excess reagent to get the heavy metal residual level below accepted discharge limits. In the xanthate method, only a slight excess of reagent is necessary.

DETAILED DESCRIPTION OF THE INVENTION

The necessary criteria for cationic polymers which are useful in accordance with the invention are: (1) they must be water soluble; and (2) they must have sufficient charge to form insoluble complexes with starch xanthate and metal ion. Examples of such compounds include polymers containing amino, ammonium, phosphonium, or sulfonium groups, cationic starches and flours, poly(vinylbenzyltrimethylammonium chloride) (PVBTMAC), commercial cationic polyacrylamide (CPA), commercial cationic starches (CSt-1 and CSt-2), aminoethylated wheat flour (AFWF), and polyethylenimine (PEI), all of which are considered to be essentially equivalent for use in accordance with the invention.

Anionic polymers must also be water soluble and have sufficient charge. Types of anionic compounds useful in accordance with the invention include water-soluble derivatives of polyhydroxy polymers such as starch, cellulose, dextrins, hemicellulose, and polyvinyl alcohols containing anionic groups such as xanthates, phosphates, thiols, and sulfates. The preferred anionic polymers are starch xanthates prepared by the method of Swanson et al. [Ind. Eng. Chem. Prod. Res. Develop. 3(1): 22 (1964)] having xanthate degree of substitution (D.S.) of from 0.06 to 1. Starch xanthate having a D.S. as high as 3 could also be used, but it is difficult and expensive to prepare. The preferred range of xanthate D.S. is from 0.1 to 0.4.

Heavy metals are herein defined to include cadmium, chromium, copper, iron, lead, manganese, mercury, nickel, silver, and zinc.

When all components of the method [i.e., heavy metal ions (M), cationic polymer (CP), and starch xanthate (st-xan)] are present in solution in the proper amounts, a precipitate forms which contains the metal ions. That is to say, as long as a precipitate forms, the metal ions in solution will be removed. The proper amounts of the three components vary in a complex manner as the relative concentration of each component varies. The presence of other contaminants can also affect the necessary quantities of reactants. Concentrations of CP and st-xan sufficient to form a precipitate can be determined easily by taking a small sample of the polluted effluent and by trial and error adding of the reactants until a precipitate can be seen. However, for optimum removal of the contaminating heavy metals, more elaborate means must be used.

In accordance with the invention, concentrations of heavy metals are determined, a quantity of CP added to a sample of the effluent, and st-xan added slowly until a precipitate forms. The amounts of CP vary from 1 to 2,000 times the amount of metal ions. In solutions containing 0.9 part per million (p.p.m.) $Hg^{+2}$, it was found that up to 1,774 p.p.m. of PVBTMAC could be added effectively. Tables 3 through 7 clearly show that $Hg^{+2}$ is representative of all heavy metal ions and that all heavy metal concentrations are significantly reduced in the same manner when treated in accordance with the invention.

The optimum end point of the precipitation can be determined easily by a streaming current detector (SCD) which indicates the state of balanced charge when titrating one polyelectrolyte with another having an opposite charge (e.g., titrating the mixture of M and CP with st-xan). Graphs of SCD readings as a function of titrant volume are sigmoid and resemble acid-base titration curves. The more vertical segment of the curve crosses the zero-SCD-reading axis and coincides with precipitation of the CP-M-st-xan complex.

To provide reproducible means of selecting the amount of st-xan required to precipitate a mixture of M and CP, SCD titrations were run each day on each sample to be precipitated. This procedure was necessitated by the slow decomposition of st-xan over a period of weeks and by the narrow latitude for end-point error in achieving maximum removal of M. The validity of SCD titrations for determining these end points was established by evaluation of their reproducibility on replicate samples and on samples having different M and CP concentrations.

These tests indicated that the volume of titrant required to produce zero SCD reading is nearly constant for replicate samples but that the volume required for other SCD readings varies somewhat from titration to titration.

Since the range of SCD readings on the effective segment of the curve varies from sample to sample, no one SCD reading (other than zero) is usable as an end point for all precipitations. In this work end points were selected at SCD readings one-third to one-half way from zero to the beginning of curvature for the plateau of excess xanthate (between −0.4 and −4 SCD reading). This selection assured maximum effectiveness in precipitation of M if concentrations of M, CP, or st-xan varied slightly from sample to sample.

In order to determine the effect of varying concentrations of M, CP, and st-xan on the resulting residual M concentration, the system of $Hg^{+2}$, PVBTMAC, and st-xan was studied. Keeping initial $Hg^{+2}$ concentration constant at 100 p.p.m. and increasing the PVBTMAC concentrates from 0.1 to 1.0 g./l. (i.e., amounts of CP equaling from 1 to 10 times the weight of $Hg^{+2}$) required increasing st-xan from 0.64 to 2.29 g./l. D.S. 0.23 to obtain the precipitation end point. At a PVBTMAC concentration of 0.5 g./l. the residual $Hg^{+2}$ concentration was at a minimum of 6.6 parts per billion (p.p.b.).

When CP concentration was held at a constant level of 0.2 g./l. and initial $Hg^{+2}$ was increased from 0.1 to 100 p.p.m. (i.e., amounts of CP equaling from 2 to 2,000 times the weight of $Hg^{+2}$), it was necessary to increase the amount of st-xan only from 0.62 to 1.0 g./l. to obtain minimum residual $Hg^{+2}$. When initial $Hg^{+2}$ concentration was from 50 to 80 p.p.m., residual $Hg^{+2}$ was below the tentative U.S. Public Health Service drinking water standard of 5 p.p.b.

Varying the rate of st-xan addition showed that lower residual $Hg^{+2}$ concentrations were favored with a lower rate of addition. It was also shown that by adding CP prior to st-xan, lower residual $Hg^{+2}$ concentrations were obtained.

In Example 21, infra, three sets of experiments were performed wherein the amounts of CP varied from about 1 tp 2,000 times the weight of $Hg^{+2}$. The first experiment in each set was run in accordance with the invention. The second and third experiment in each set were repeats of the first with the exception that st-xan was omitted from the second and CP was omitted from the third. With st-xan omitted, little or no precipitate formed. With CP omitted, precipitates formed as expected [see C. R. Russell et al. Tappi 45: 557–566 (July 1962)], but residual $Hg^{+2}$ was 3 to 550 times greater when CP was omitted than when both CP and st-xan were present during the precipitation.

In another study, precipitates were formed by adding st-xan having D.S. values of from 0.15 to 0.40 to solution containing from 4 to 100 p.p.m. $Hg^{+2}$. Residual $Hg^{+2}$ was from 5 to 100 times greater than comparable reactions containing the calculated amounts of CP. Thus, a definite synergistic effect is obtained when st-xan is used in combination with a suitable CP in accordance with the invention.

The fourth experiment in each set of experiments described in Example 21 was a repeat of the third experiment, while the fifth experiment consisted of adding the calculated amount of CP to the clear filtrate from the fourth experiment and recovering the resulting precipitate. Residual $Hg^{+2}$ in the filtrate after the addition of CP was essentially as low as the residual $Hg^{+2}$ in the filtrates from the first experiment in each set.

Besides the synergistic effect of the combined use of st-xan and CP, the results of Example 21 show that the sequence of addition is not critical and that the effect of CP addition is not simply one of suspended particle flocculation. Since the filtrates from the experiments in which CP was omitted were crystal clear, the 10 to 153 mg. of material remaining in the filtrates must have been in solution and the CP, subsequently added to the filtrates, reacted with this soluble material to form an insoluble precipitate.

There was little effect of initial pH of the test solutions over the range of 3–11 on the effectiveness of precipitation of the complex. Temperatures from 0°–50° C. are preferred. Temperatures above 50° C. may affect solubilities of the complexes. All examples were performed at room temperature (i.e., about 25° C.).

Sodium chloride concentrations of over 2.6 percent increased the concentration of residual $Hg^{+2}$ severalfold and may reflect increased solubility of the polyelectrolyte complex in salt solutions as has been reported by Michaels and Bixler (*Kirk-Othmer Encyclopedia of Chemical Technology*, Volume 16, Interscience Publishers, New York, New York, 1968, pages 117–133). In addition, high concentrations of salt hinder identification of the end point by SCD titration.

Test solutions containing the sodium salt of citric, diglycolic, nitrilotriacetic, or tripolyphosphoric acid, in addition to the $Hg^{+2}$, were treated with st-xan and PVBTMAC. Presence of these sequestrants at the test level does not greatly affect the residual mercury concentration. However, the amount of xanthate required for precipitation depends on the type and amount of sequestrant present in the test solution.

To show the effectiveness of the method, solutions of several common heavy metal pollutants were treated with the PVBTMAC-st-xan system individually and in mixtures. The results were compared with results of a method now commonly used in industry. A sample of an industrial effluent containing heavy metal ions was also treated and compared as above. All but four of the heavy metal ion species were reduced to below the most stringent discharge limits, and of these four only $Mn^{+2}$ was significantly higher. Removal of all heavy metal species except $Fe^{+3}$, $Pb^{+2}$, $Mn^{+2}$, and $Zn^{+2}$ by the instant method far exceeded that which was obtained by the commonly used industrial method.

Any process for removing noxious substances from water should not add others. Contaminants that might be visualized as being introduced by treatment of water with st-xan and a CP include: small ionic species ($Cl^{+1}$ from these cationic polymers; $Na^{+1}$, $OH^{-1}$, and $CS_3^{-2}$ from the xanthate), small nonionic species ($CS_2$ and COS from the xanthate), and the polyelectrolytes themselves. However, analyses of the supernatant show that the method does not introduce legally unacceptable concentrations of these residual contaminants, nor does it contain contaminants which raise the oxygen demands levels above maximum standards.

Oxygen demands, $BOD_5$ [Alsterberg (azide) modification of Winkler's method] and COD, were estimated as recommended in *Standard Methods for the Examination of Water and Wastewater*, 11th Edition, American Public Health Association, Inc., New York, New York, 1960, pages 309–312, 318–324, and 399–402).

The examples, both above and following, are intended only to be illustrative embodiments and should not be construed as limiting the scope of the invention as claimed.

EXAMPLES 1–14

All solutions and dispersions were prepared with distilled water that had no detectable mercury.

Starch xanthates having D.S.'s in the range 0.11–0.40 were prepared in a high shear mixer as described by Swanson et al. (supra), diluted to about 10 percent concentration (w/v, starch basis), and stored at 34° F. Portions of these stock dispersions were diluted to 1 percent (w/v, starch basis) daily for performing all titrations and precipitations.

The CP's, PVBTMAC, and PEI were stored as aqueous dispersions (about 33 percent, w/w). Each was diluted to 1 percent concentration (w/v) for use.

Mercury(II) chloride (2.707 g.) and concentrated hydrochloric acid (1 ml.) were dissolved in a small amount of water and the solution was diluted to 1:1. Portions of this stock solution (2,000 mg./l. or 0.01$\underline{M}$) were used to prepare test samples as well as analytical standards containing 1, 5, 10, or 15 $\mu$g. of mercury per liter.

In 150-ml. beakers were prepared 50-ml. samples of each test solution, which had pH values of about 3.2. The desired amount of CP was run into each sample from a burette and the requisite amount of st-xan (as determined by SCD titration) was added dropwise from a second burette.

During addition of the st-xan and for 10 minutes thereafter, unless otherwise noted, each sample was stirred with a magnetic stirrer at a rate that produced a vortex about 1.2 cm. deep. Samples were filtered through medium porosity 60-ml. sintered glass funnels into 125-ml. graduated Erlenmeyer flasks. The filtrates were clear and contained no suspended particles. Each beaker was rinsed with about 10 ml. of water that was also collected. The contents of each flask were diluted to the 100-ml. mark before analysis.

An SCD indicated the state of balanced charge when titrating CP with st-xan. In the SCD an alternating streaming current is generated when the test solution flows across two silver electrodes as it alternately is displaced from a cavity on the downstroke of a reciprocating piston and returns to the cavity on the upstroke. This current is rectified and amplified to drive a microammeter. The meter's scale is arbitrarily divided into 20 equal units ascending from −10 to +10. Scale expansion electronics permit full-scale readings of ±5 to ±200 scale units.

To determine the SCD titration value, a desired volume of CP solution (0.5–10 ml.) was added to 50 ml. of water or other test solution and, at arbitrary intervals during the titration with st-xan, the solution's SCD reading was determined. Titration was discontinued on evidence of leveling of the SCD curve after precipitate had formed.

Concentrations of residual mercury were measured at the 253.6 mm. mercury line by flameless atomic absorption in a Varian Techtron AA120 spectrophotometer. The mercury vapor train used in analysis was similar to that of The Dow Chemical Company (Method CAS-AM-70.13, June 22, 1970) but included a drying tube loosely filled with glass wool immediately downstream from the magnesium perchlorate bottle.

Our procedure differed as we used 1 ml. of 5 percent potassium persulfate in addition to 1 ml. $H_2SO_4$ (1:4) and 1 ml. $KMnO_4$ (4 percent, w/v) for digestion of the samples. Also, we digested samples on a steam bath for ½ hour rather than boiling them for a few seconds on a hot plate. The persulfate aided oxidation of samples having measurable amounts of organic matter of sulfides, which were produced under the less favorable test conditions; heating on the steam bath avoided bumping during digestion without apparent detriment to the accuracy of analysis. Aeration was identical with the Dow procedure except that we aerated 100-ml. samples directly in the 125-ml. sample flasks.

Combined relative standard error for the precipitation and analysis was 16.7 percent (8 degrees of freedom) at the 8.0 $\mu$g./l. residual mercury level.

The results of varying the quantities of PVBTMAC and initial $Hg^{+2}$ are shown in terms of amounts of st-xan needed and amounts of residual $Hg^{+2}$.

Table 1

| Example No. | Initial $Hg^{+2}$, p.p.m. | PVBTMAC, g./l. | St-xan (0.23 D.S.), g./l. | Residual $Hg^{+2}$, p.p.b. |
|---|---|---|---|---|
| 1 | 100.0 | 0.10 | 0.640 | 23.7 |
| 2 | 100.0 | 0.20 | 0.830 | 12.0 |
| 3 | 100.0 | 0.50 | 1.390 | 6.6 |
| 4 | 100.0 | 1.00 | 2.290 | 58.1 |
| 5 | 4.0 | 0.02 | 0.086 | 2.3 |
| 6 | 20.0 | 0.05 | 0.242 | 2.3 |
| 7 | 50.0 | 0.20 | 0.760 | 5.1 |
| 8 | 0.1 | 0.20 | 0.623 | 8.3 |
| 9 | 1.0 | 0.20 | 0.630 | 18.2 |
| 10 | 10.0 | 0.20 | 0.655 | 46.5 |
| 11 | 25.0 | 0.20 | 0.680 | 33.3 |
| 12 | 100.0 | 0.20 | 1.006 | 4.5 |
| 13 | 40.0 | 0.00 | 0.174 | 365.0 |
| 14 | 100.0 | 0.00 | 0.400 | 267.0 |

EXAMPLE 15

The method of Examples 1–14 was repeated with an initial $Hg^{+2}$ concentration of 100 p.p.m., a polyethylenimine concentration of 0.2 g./l. and with additions of 1.624 g./l. of st-xan (0.12 D.S.) at varying rates. Table 2 compares the rate of st-xan addition with residual $Hg^{+2}$.

Table 2

| Rate of addition, ml./min. | Residual $Hg^{+2}$, p.p.b. |
|---|---|
| 29.30 | 127.0 |
| 27.10 | 120.0 |
| 9.40 | 52.6 |
| 8.10 | 40.7 |
| 3.60 | 21.1 |
| 3.30 | 26.5 |
| 0.99 | 6.6 |
| 0.74 | 10.0 |

EXAMPLE 16

Solutions (0.01M) of several heavy metal ions (M) were prepared and treated as described in Examples 1–14. In addition, each solution containing M and 0.2 g./l. PVBTMAC was adjusted with 0.1N NaOH so that the final pH after treatment was 7.0. Identical solutions containing only M were treated with 0.1N NaOH to give a pH of 9 for comparison of the basic precipitation method with the method of the invention. Table 3 compares the amount of st-xan (0.23 D.S.) needed for precipitation to the amount of residual metal, and to the State of Illinois discharge limits for public and food processing waters, Illinois Pollution Control Board, Newsletter No. 44, March 8, 1972, page 7.

EXAMPLE 17

A mixture of M's was treated in the same manner as in Example 16 and required 0.88 g./l. of st-xan to precipitate the ions, Table 4.

EXAMPLE 18

Two industrial effluents, A and B, containing the same M species as Example 17 were treated as in Example 17 and required 0.52 and 0.96 g./l. st-xan to precipitate the metal ions, Table 5.

EXAMPLE 19

A mixture of M species was treated with various CP's and st-xan (0.23 D.S.) in the same manner as in Example 17, Table 6.

Table 3

| Metal | Treatment | St-xan, g./l. | Initial metal, µg./l. | Residual metal, µg./l. | Illinois limit, µg./l. |
|---|---|---|---|---|---|
| $Cd^{+2}$ | St-xan-PVBTMAC | 0.93 | 56,200 | 8 | 50 |
|  | NaOH (pH 9) |  | 56,200 | 4,500 |  |
| $Cr^{+3}$ | St-xan-PVBTMAC | 0.69 | 26,000 | 52 | 1,000 |
|  | NaOH (pH 9) |  | 26,000 | 416 |  |
| $Cu^{+2}$ | St-xan-PVBTMAC | 0.90 | 31,770 | 12 | 20 |
|  | NaOH (pH 9) |  | 31,770 | 24 |  |
| $Fe^{+2}$ | St-xan-PVBTMAC | 0.68 | 27,920 | 2,980 | 1,000 |
|  | NaOH (pH 9) |  | 27,920 | 14,500 |  |
| $Fe^{+3}$ | St-xan-PVBTMAC | 0.74 | 27,920 | 890 | 1,000 |
|  | NaOH (pH 9) |  | 27,920 | 15 |  |
| $Pb^{+2}$ | St-xan-PVBTMAC | 0.92 | 103,600 | 8 | 100 |
|  | NaOH (pH 9) |  | 103,600 | 8 |  |
| $Mn^{+2}$ | St-xan-PVBTMAC | 0.82 | 27,470 | 10,700 | 1,000 |
|  | NaOH (pH 9) |  | 27,470 | 9,600 |  |
| $Hg^{+2}$ | St-xan-PVBTMAC | 0.94 | 100,000 | 3.8 | 0.5 |
|  | NaOH (pH 9) |  | 100,000 | 8,140 |  |
| $Ni^{+2}$ | St-xan-PVBTMAC | 0.83 | 29,350 | 275 | 1,000 |
|  | NaOH (pH 9) |  | 29,350 | 4,350 |  |
| $Ag^{+1}$ | St-xan-PVBTMAC | 0.90 | 53,935 | 3 | 5 |
|  | NaOH (pH 9) |  | 53,935 | 14,800 |  |
| $Zn^{+2}$ | St-xan-PVBTMAC | 0.82 | 32,680 | 3,300 | 1,000 |
|  | NaOH (pH 9) |  | 32,680 | 1,010 |  |

Table 4

| Treatment | Metal, p.p.b. | | | | | | | | | |
|---|---|---|---|---|---|---|---|---|---|---|
|  | $Cd^{+2}$ | $Cr^{+3}$ | $Cu^{+2}$ | $Fe^{+2}$, $Fe^{+3}$ | $Pb^{+2}$ | $Mn^{+2}$ | $Hg^{+2}$ | $Ni^{+2}$ | $Ag^{+1}$ | $Zn^{+2}$ |
| None | 5,620 | 2,600 | 3,177 | 5,484 | 10,360 | 2,747 | 10,000 | 2,935 | 5,394 | 3,268 |
| St-xan-PVBTMAC | 3 | 21 | 16 | 990 | 8 | 1,510 | 3.8 | 57 | 5 | 319 |
| NaOH (pH 9) | 390 | 31 | 20 | 34 | 8 | 833 | 4,275 | 681 | 62 | 53 |
| Illinois limit | 50 | 1,000 | 20 | 1,000 | 100 | 1,000 | 0.5 | 1,000 | 5 | 1,000 |

Table 5

| Effluent | Treatment | Metal, p.p.b. | | | | | | | | | |
|---|---|---|---|---|---|---|---|---|---|---|---|
|  |  | $Cd^{+2}$ | $Cr^{+3}$ | $Cu^{+2}$ | $Fe^{+2}$, $Fe^{+3}$ | $Pb^{+2}$ | $Mn^{+2}$ | $Hg^{+2}$ | $Ni^{+2}$ | $Ag^{+1}$ | $Zn^{+2}$ |
| A | None | 10 | 58 | 115 | 34,640 | 231 | 1,500 | 0.24 | 230 | 7 | 3,460 |
| A | Treated | 2 | 1 | 17 | 31,120 | 8 | 675 | — | 57 | 7 | 479 |
| B | None | 29 | 8,250 | 13,670 | 38,900 | 4,500 | 1,495 | 0.00 | 2,000 | 32 | 8,520 |
| B | Treated | 11 | 94 | 17 | 38,240 | 8 | 1,132 | — | 133 | 7 | 7,610 |
|  | Illinois limit | 50 | 1,000 | 20 | 1,000 | 100 | 1,000 | 0.50 | 1,000 | 5 | 1,000 |

Table 6

| Treatment | Metal, p.p.b.[1] | | | | | | | | | |
|---|---|---|---|---|---|---|---|---|---|---|
|  | $Cd^{+2}$ | $Cr^{+3}$ | $Cu^{+2}$ | $Fe^{+2}$ | $Pb^{+2}$ | $Mn^{+2}$ | $Hg^{+2}$ | $Ni^{+2}$ | $Ag^{+1}$ | $Zn^{+2}$ |
| None | 5,620 | 2,600 | 3,177 | 5,484 | 10,360 | 2,747 | 10,000 | 2,935 | 5,394 | 3,268 |
| St-xan-PVBTMAC[2] | 7 | 0 | 3 | 66 | 8 | 1,179 | 3.6 | 45 | 3 | 73 |
| St-xan-PEI[3] | 35 | 11 | 2 | 42 | 8 | 83 | tr | 135 | 3 | 67 |
| St-xan-CPA[4] | 10 | 0 | 1 | 50 | 8 | 1,093 | tr | 61 | 5 | 77 |
| St-xan-CSt-1[5] | 30 | 44 | 6 | 583 | 8 | 1,083 | tr | 338 | 5 | 1,037 |

Table 6-continued

| Treatment | Metal, p.p.b.[1] | | | | | | | | | |
|---|---|---|---|---|---|---|---|---|---|---|
| | $Cd^{+2}$ | $Cr^{+3}$ | $Cu^{+2}$ | $Fe^{+2}$ | $Pb^{+2}$ | $Mn^{+2}$ | $Hg^{+2}$ | $Ni^{+2}$ | $Ag^{+1}$ | $Zn^{+2}$ |
| St-xan-CSt-2[6] | 83 | 11 | 15 | 92 | 8 | 833 | tr | 354 | 8 | 210 |
| St-xan-AFWF[7] | 26 | 0 | 6 | 100 | 8 | 1,083 | tr | 69 | 13 | 73 |
| Illinois limit | 50 | 1,000 | 20 | 1,000 | 100 | 1,000 | 0.5 | 1,000 | 5 | 1,000 |

[1] Metal concentration determined by atomic absorption with a Varian Techtron AA120 spectrophotometer.
[2] PVBTMAC, 0.2 g./l.; st-xan, 0.78 g./l.
[3] PEI, 0.2 g./l.; st-xan, 0.84 g./l.
[4] CPA (a commercial cationic polyacrylamide), 0.2 g./l.; st-xan, 0.34 g./l.
[5] CSt-1 (a commercial cationic starch, "Cato 8"), 0.4 g./l.; st-xan, 0.26 g./l.
[6] CSt-2 (a commercial cationic starch, "Cato 15"), 0.4 g./l.; st-xan, 0.28 g./l.
[7] AFWF (aminoethylated wheat flour), 0.4 g./l.; st-xan, 0.34 g./l.

EXAMPLE 20

A mixture of M's were treated as described in Example 16 except that 25 gal. of the mixture, containing 18.925 g. PEI on a dry basis, were treated with 796 g. of st-xan 0.23 D.S. (10 percent solution). The resulting solution was treated and analyzed as described in Examples 1-14, see Table 7.

EXAMPLE 21

This example consists of three sets of experiments (i.e., a–e, f–j, and k–p). Amounts of cationic polymer were 1, 1,971, and 98.5 times the weight of $Hg^{+2}$, respectively, for the three sets. The first experiment in each set (i.e., a, f, and k) was performed and analyzed as described in Examples 1-14 (supra). CP-M-st-xan complex precipitates were removed by filtration under vacuum thrugh a 10–15 µ pore size sintered glass filter, dried and weighed, and the filtrates were analyzed for residual mercury. The second and third experiment in each set (i.e., b and c, g and h, and l and m) were repeats of the first with the exception that st-xan was left out of b, g, and l and CP was left out of c, h, and m. In the next to last experiment in each set (i.e., d, i, and n) the proper amount of st-xan, determined from the first experiment in each set, was added to the mercury solution and the expected precipitate recovered by filtration. The precipitates in experiments d and i were captured on 4–5.5 µ sintered glass filters and the filtrates were crystal clear (i.e., no visible suspended particles). The filtrate which came through a 10–15 µ sintered glass filter in experiment n was black and turbid due to impurities in the st-xan. The precipitates obtained from the addition of st-xan alone represented a very small percentage of the total weight of reagents (i.e., experiment d = 16 percent, experiment i = 0.4 percent, and experiment n = 0.6 percent). When the proper amounts of CP were added to the clear filtrates obtained from experiments d, i, and n, precipitates formed which equaled 95 percent, 106 percent, and 94 percent, respectively, of the theoretical amount (see Table 8).

Table 7

| Treatment | Metal, p.p.b. | | | | | | | | | |
|---|---|---|---|---|---|---|---|---|---|---|
| | $Cd^{+2}$ | $Cr^{+3}$ | $Cu^{+2}$ | $Fe^{+2}$ | $Pb^{+2}$ | $Mn^{+2}$ | $Hg^{+2}$ | $Ni^{+2}$ | $Ag^{+1}$ | $Zn^{+2}$ |
| None | 5,620 | 2,600 | 3,177 | 5,484 | 10,360 | 2,747 | 10,000 | 2,935 | 5,394 | 3,268 |
| St-xan-PEI | 27 | 22 | 3 | 100 | 8 | 2,375 | 2 | 77 | 3 | 220 |
| Illinois limit | 50 | 1,000 | 20 | 1,000 | 100 | 1,000 | 0.5 | 1,000 | 5 | 1,000 |

Table 8

| Example 21 | Initial $Hg^{+2}$, p.p.b. | CP, mg. | St-xan | | PPT, theory | Mg. recovered | Residual $Hg^{+2}$, p.p.b. | $CP:Hg^{+2}$ by wt. | Filter pore size, µ |
|---|---|---|---|---|---|---|---|---|---|
| | | | D.S. | mg. | | | | | |
| a | 40,000 | 2.0 | 0.08 | 10.5 | 14.5 | 12.0 | 56 | 1:1 | 10–15 |
| b | 40,000 | 2.0 | — | 0 | 4.0 | 3.1 | 1,060 | 1:1 | 4–5.5 |
| c | 40,000 | 0 | 0.08 | 10.5 | 12.5 | 0 | 620 | — | 4–5.5 |
| d | 40,000 | 0 | 0.08 | 10.5 | 12.5 | 2.0 | — | — | 4–5.5 |
| e | — | 2.1 | — | — | 12.6 | 12.0 | 1.12 | 1:1 | 10–15 |
| f | 900 | 88.7 | 0.35 | 79 | 167.7 | 168.2 | 0.18 | 1971:1 | 10–15 |
| g | 900 | 88.7 | — | 0 | 88.7 | 0.7 | 820 | 1971:1 | 4–5.5 |
| h | 900 | 0 | 0.35 | 79 | 79 | 0.3 | 680 | — | 4–5.5 |
| i | 900 | 0 | 0.35 | 79 | 79 | 0.3 | — | — | 4–5.5 |
| j | — | 60.9 | — | — | 139.6 | 148.7 | 24 | 1353:1 | 10–15 |
| k | 80,000 | 394 | 0.59 | 150 | 548 | 514 | 14 | 98.5:1 | 10–15 |
| l | 80,000 | 394 | — | 0 | 398 | 0 | 71,800 | 98.5:1 | 4–5.5 |
| m | 80,000 | 0 | 0.59 | 150 | 154 | 1 | 1,640 | — | 10–15 |
| n | 80,000 | 0 | 0.59 | 150 | 154 | 1 | — | — | 10–15 |
| p | — | 240 | — | — | 393 | 370 | 3.2 | 60:1 | 10–15 |

We claim:
1. A method of removing heavy metal ions from aqueous solutions comprising the following steps:
 a. determining the concentration of heavy metal ions in an aqueous solution;
 b. adding to said aqueous solution a water-soluble cationic polymer in amounts of from 1 to 2000 times the weight of heavy metal ions;
 c. adding starch xanthate having a xanthate degree of substitution (D.S.) of from 0.06 to 3 to the aqueous solution resulting from step (b) in amounts sufficient to form a cationic polymer-heavy metal ion-starch xanthate complex precipitate and to place the resulting supernatant essentially in a state of balanced charge; and d. separating said precipitate from the supernatant.

2. A method of removing heavy metal ions from aqueous solutions as described in claim 1 wherein the water-soluble cationic polymer is poly(vinylbenzyltrimethylammonium chloride) or polyethylanimine.

3. A method of removing heavy metal ions from aqueous solutions as described in claim 1 wherein the starch xanthate has a D.S. of from 0.1 to 1.

4. A method of removing heavy metal ions from aqueous solutions as described in claim 1 wherein the starch xanthate has a D.S. of from 0.1 to 0.4.

* * * * *